United States Patent [19]
Mayhew

[11] Patent Number: 5,510,831
[45] Date of Patent: Apr. 23, 1996

[54] AUTOSTEREOSCOPIC IMAGING APPARATUS AND METHOD USING SUIT SCANNING OF PARALLAX IMAGES

[75] Inventor: Christopher A. Mayhew, Oakton, Va.

[73] Assignee: Vision III Imaging, Inc., Herndon, Va.

[21] Appl. No.: 194,398

[22] Filed: Feb. 10, 1994

[51] Int. Cl.6 ................................................. H04N 13/02
[52] U.S. Cl. ........................................ 348/47; 348/51
[58] Field of Search .............................. 348/47, 46, 43, 348/51, 50, 49, 48, 42

[56] References Cited

U.S. PATENT DOCUMENTS

| | | | |
|---|---|---|---|
| 1,950,473 | 3/1934 | Brand | 88/16.6 |
| 2,002,090 | 5/1935 | Ives | 88/16.6 |
| 2,158,660 | 5/1939 | Kanolt | 95/36 |
| 2,356,441 | 8/1944 | Bickley | 88/16.6 |
| 2,933,008 | 4/1960 | Barnett | 88/14 |
| 3,608,457 | 9/1971 | Barker | 95/18 |
| 4,006,291 | 2/1977 | Imsand | 358/92 |
| 4,062,045 | 12/1977 | Iwane | 358/88 |
| 4,190,856 | 2/1980 | Ricks | 348/51 |
| 4,303,316 | 12/1981 | McElveen | 352/57 |
| 4,420,230 | 12/1983 | McElveen | 352/43 |
| 4,429,328 | 1/1984 | Jones, Jr. et al. | 358/88 |
| 4,476,492 | 10/1984 | Muth | 358/208 |
| 4,528,587 | 7/1985 | Jones, Jr. | 358/92 |
| 4,567,513 | 1/1986 | Imsand | 348/55 |
| 4,714,319 | 12/1987 | Zeevi et al. | 350/144 |
| 4,815,819 | 3/1989 | Mayhew et al. | 350/144 |
| 4,884,131 | 11/1989 | Chevion et al. | 348/43 |
| 4,966,436 | 10/1990 | Mayhew et al. | 350/143 |
| 5,014,126 | 5/1991 | Pritchard et al. | 358/91 |
| 5,081,530 | 1/1992 | Medina | 358/88 |
| 5,142,357 | 8/1992 | Lipton et al. | 348/48 |
| 5,142,642 | 8/1992 | Sudo | 348/49 |
| 5,157,484 | 10/1992 | Pritchard et al. | 358/91 |
| 5,193,000 | 8/1993 | Lipton et al. | 358/92 |

FOREIGN PATENT DOCUMENTS

| | | |
|---|---|---|
| 57-37993A | 3/1982 | Japan . |
| 1-107247A | 4/1989 | Japan . |
| 2135470 | 8/1984 | United Kingdom . |

Primary Examiner—Tommy P. Chin
Assistant Examiner—Bryan S. Tung
Attorney, Agent, or Firm—Finnegan, Henderson, Farabow, Garrett & Dunner

[57] ABSTRACT

Autostereoscopic imaging is achieved by acquiring succession of first and second image frames from at least two different points of view, and image processing the first and second image frames, such that progressively different partial images of at least focussed and converged subject images in the second image frames are substituted for corresponding subject partial images in the first image frames in repeating sequence on a corresponding image frame-by-image frame basis to create a succession of composite image frames. Two-dimensional display of the resulting succession of composite image frames is perceivable in three-dimensional illusion.

38 Claims, 12 Drawing Sheets

FRAME 1

FRAME 3

FRAME 2

FRAME 4

FRAME 1

FRAME 2

FRAME 3

FRAME 4

FRAME 5

FRAME 6

FRAME 7

FRAME 8

FRAME 1

FRAME 2

FRAME 3

FRAME 4

FRAME 5

FRAME 6

FRAME 7

FRAME 8

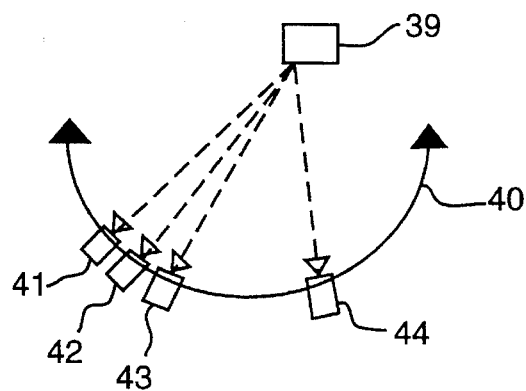
FIG. 9
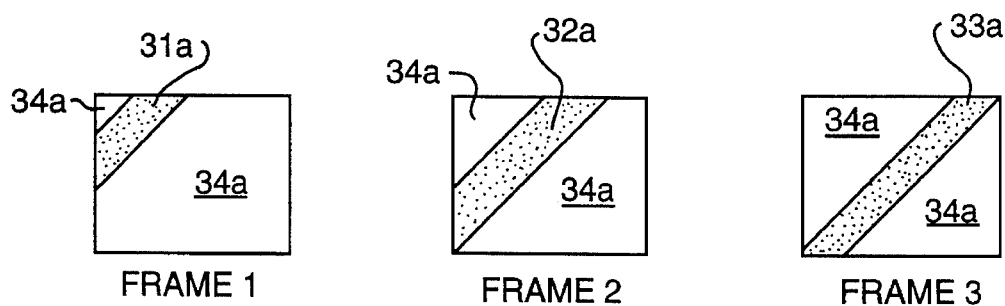
FIG. 10(a) FIG. 10(b) FIG. 10(c)
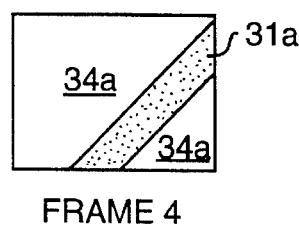 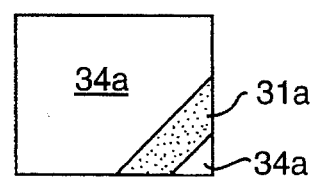
FIG. 10(d) FIG. 10(e)

AUTOSTEREOSCOPIC IMAGING APPARATUS AND METHOD USING SUIT SCANNING OF PARALLAX IMAGES

BACKGROUND OF THE INVENTION

I. Field of the Invention

The present invention relates to the visual arts field and more particularly to autostereoscopic imaging apparatus and methods for producing two-dimensional images that, on display two-dimensionally, can be perceived three-dimensionally without the use of special viewing aids.

II. Prior Art

The production of two-dimensional images that can be displayed to provide a three-dimensional illusion has been a long standing goal in the visual arts field. Methods and apparatus for producing such three-dimensional illusions have to some extent paralleled the increased understanding of the physiology of human depth perception, as well as developments in image manipulation through analog/digital signal processing and computer imaging software.

Binocular (stereo) vision requires two eyes that look in the same direction with overlapping visual fields. Each eye views a scene from a slightly different parallax angle, and focuses the scene image onto the retina, a concave surface at the back of the eye that is lined with nerve cells or neurons. The two-dimensional retinal images are transmitted along the optic nerves to the brain's visual cortex, where they are combined in a process known as stereopsis to form a three-dimensional model of the scene. What stereopsis is and how it is performed are still matters of some debate.

Perception of three-dimensional space depends on various kinds of information in the scene being viewed, e.g., monocular cues such as relative size, linear perspective, interposition, and light and shadow; binocular cues such as retinal disparity (parallax information), accommodation, and convergence; and learned cues (familiarity with objects in the scene).

Parallax information does not have to be presented to the brain simultaneously. It is known that left and right eye depth information can be presented alternately to the left and right eyes, resulting in depth perception, as long as the time interval does not exceed 100 msec. The brain can extract parallax information from a three-dimensional scene even when the right and left eyes are alternately covered and uncovered for periods of up to 100 msec each. The brain can also accept and process parallax information presented concurrently to both eyes if sequenced properly. The ideal view cycle sequencing rate is between 3–6 Hz.

True three-dimensional image displays can be divided into two main categories, stereoscopic (also known as binocular) and autostereoscopic. Stereoscopic techniques (including stereoscopes, polarization, anaglyphic, Pulfrich, and shuttering technologies) require the viewer to wear special viewing glasses. Autostereoscopic techniques (such as holography, lenticular screens, parallax barriers, and alternating pairs, and parallax scans) can produce images with a true three-dimensional illusion without the use of special glasses.

Prior art autostereoscopic television and motion picture systems have utilized the approach of alternately displaying views of a scene recorded by two cameras from different points of view. U.S. Pat. No. 4,006,291 to Imsand; U.S. Patent No. 4,303,316 to McElveen; U.S. Pat. No. 4,429,328 to Jones et al.; and U.S. Pat. No. 4,815,819 to Mayhew et al. all utilized two cameras to record horizontally, vertically, or a combination of horizontally and vertically displaced views of a scene. While this autostereoscopic approach produces images which provide a three-dimensional illusion when displayed, it does not have a stereoscopic appearance like that of a 3-D movie. Another drawback is image instability resulting from the alternation of the points of view.

Attempts to control autostereoscopic image stability have resulted in variations of the prior art methods mentioned above. U.S. Pat. No. 4,567,513 to Imsand and U.S. Pat. No. 4,528,587 to Jones disclose methods to control image instability through video signal processing, resulting in mixed images which are not of a commercially exceptional quality.

Another approach to controlling autostereoscopic image stability is through single lens parallax scanning methods, as exemplified by U.S. Pat. No. 5,014,126 to Pritchard and Mayhew, copending U.S. patent application Ser. No. 08/115,101, filed Sep. 2, 1993 by Fernekes et al., and copending U.S. patent application Ser. No. 08/148,916, filed Nov. 5, 1993 by Bacs, Jr. While these methods produce autostereoscopic imaging of exceptional quality and stability, they do not produce an image having a stereoscopic appearance like a traditional 3-D movie which requires special viewing glasses.

SUMMARY OF THE INVENTION

A principal object of the subject invention is to provide improved methods and apparatus for producing images in two-dimension that, upon display, can be perceived as three-dimensional, i.e., having a stereoscopic appearance, with the unaided eye. The methods and apparatus of the subject invention utilize an autostereoscopic approach to two-dimensional imaging, thus avoiding the drawbacks inherent in prior art stereoscopic methods which require the viewer to wear special viewing glasses.

To achieve this objective, the autostereoscopic imaging method of the present invention comprises the steps of acquiring at least first and second two-dimensional images of a scene from different points of view; periodically scanning successively different partial images of the second image through the first image to create a succession of different composite images; and two-dimensionally displaying the composite images in perceived three-dimensional illusion.

The apparatus of the present invention includes a first imaging device for acquiring first images, consisting of a succession of first image frames; a second imaging device for acquiring second images from a different point of view than the first images and consisting of a succession of second image frames synchronized with the succession of first image frames; and a video switcher for processing the first and second image frames to create a succession of differing partial images of the second image frames and to repeatedly scan the succession of partial images through the first image frames on a corresponding image frame-by-image frame basis, thereby producing a succession of composite image frames. Display of the succession of composite image frames can be perceived in three-dimensional illusion without special viewing aids, such as glasses.

It is to be understood that both the foregoing general description and the following detailed description are exemplary and are intended to provide further explanation of the invention as claimed.

The accompanying drawings are included to provide a further understanding of the invention and are incorporated

BRIEF DESCRIPTION OF THE DRAWINGS

FIG. 9 is a schematic diagram of an alternative embodiment of the apparatus seen in FIG. 1;

FIGS. 10(a)–10(e) illustrate a succession of composite image frames that might be produced by the apparatus of FIG. 9;

Corresponding reference numerals refer to like parts throughout the several views of the drawings.

DETAILED DESCRIPTION OF THE PREFERRED EMBODIMENTS

Figure 1:
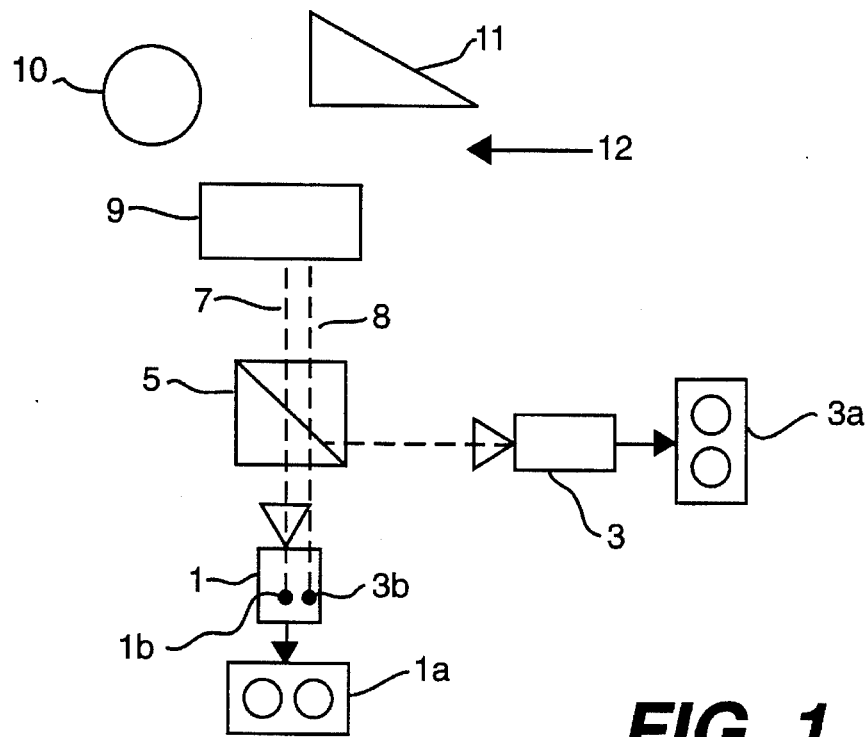
FIG. 1 is a plan view illustrating apparatus in accordance with one embodiment of the invention for recording images of a scene from view points differing in parallax.

Autostereoscopic imaging apparatus according to the embodiment of the present invention seen in FIG. 1 includes a pair of cameras 1 and 3 for concurrently acquiring separate images of a scene as synchronized successions of image frames which are stored in recorders 1a and 3a, respectively associated with cameras 1 and 3. As seen in FIG. 1, cameras 1 and 3 are orthogonally oriented to view objects 9, 10 and 11 in the scene, generally indicated at 12, through a 50/50 beam splitting optical element 5. This beam splitter, which may be in the form of a cube, plate or pellicle, makes it possible for cameras 1 and 3 to view scene 12 along image light paths whose axes 7 and 8 are in closely spaced, parallel relation. It will be appreciated that axes 7 and 8 correspond to the optical axes of the fields of view of cameras 1 and 3, respectively. Thus, beam splitter 5 creates the effect of cameras 1 and 3 being positioned at points of view 1b and 3b, respectively, that are in closely spaced, side-by-side relation. The cameras may be professional quality video cameras or film cameras. In the case of video cameras, their recorders are professional quality video tape recorders. If the cameras are film cameras, their recorders are photochemical recorders such as film magazines.

Figure 2:
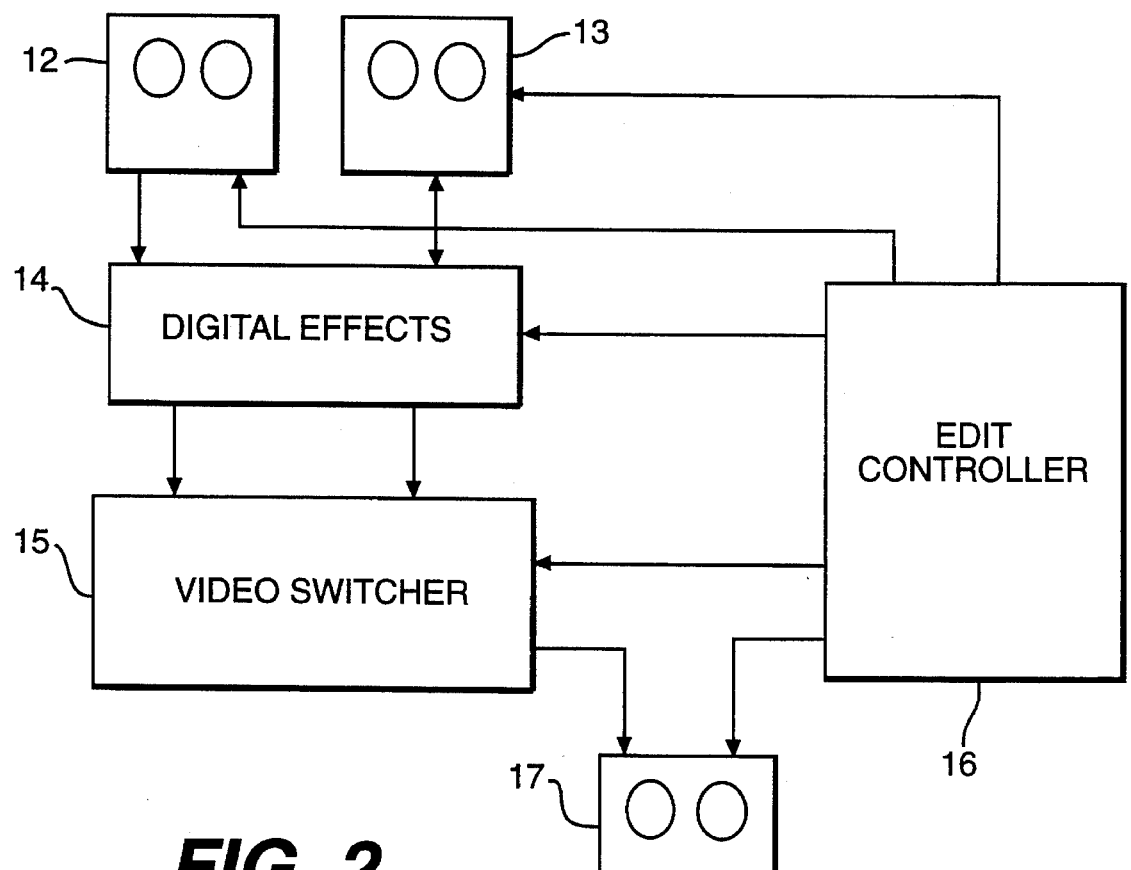
FIG. 2 is a block diagram of apparatus for digitally processing the recorded parallax images acquired by the apparatus of FIG. 1.
Figure 3A:
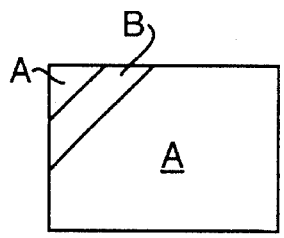
FIGS. 3(a)–3(h) illustrate one example of a succession of composite image frames which might be produced by the apparatus of FIG. 2 during a parallax scanning cycle.
Figure 3B:
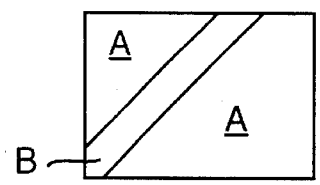
Figure 3C:
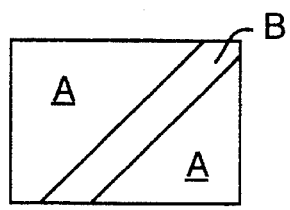
Figure 3D:
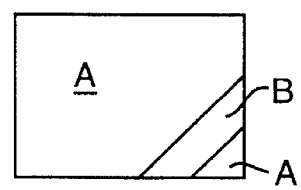
Figure 3E:
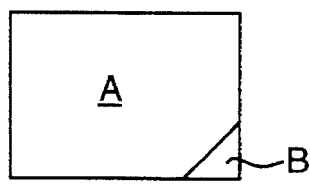
Figure 3F:
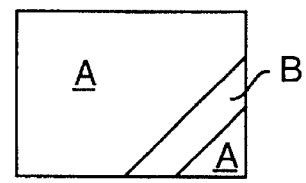
Figure 3G:
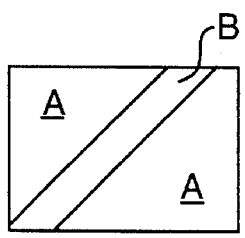
Figure 3H:
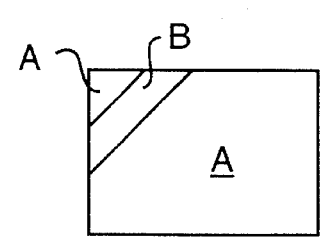
Figure 4A:
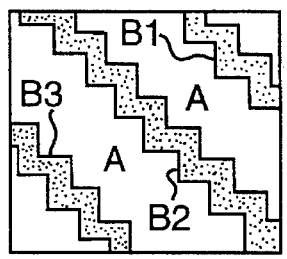
FIGS. 4(a)–4(h) illustrate another example of a succession of composite image frames that might be generated by the apparatus of FIG. 2.
Figure 4B:
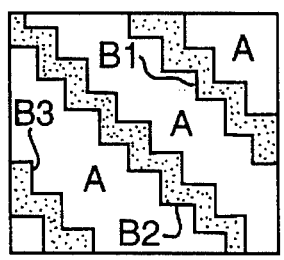
Figure 4C:
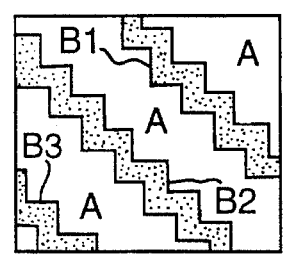
Figure 4D:
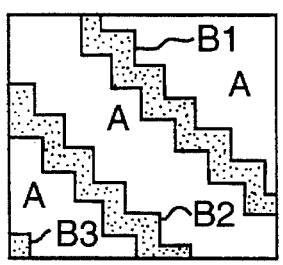
Figure 4E:
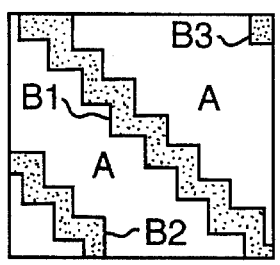
Figure 4F:
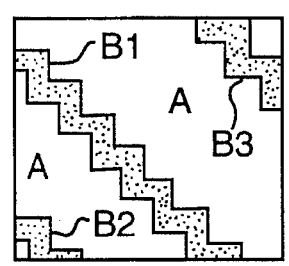
Figure 4G:
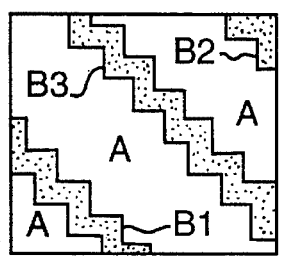
Figure 4H:
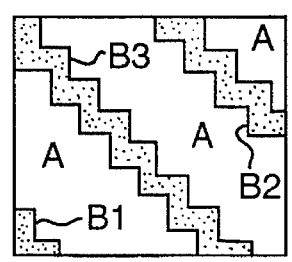

The video recordings of the scene images stored by recorders 1a and 3a of FIG. 1 are respectively loaded into video players 12 and 13 seen in FIG. 2 and, under the synchronizing control of an edit controller 16, successive image frames (still images) of the scene images are fed in parallel to a video effects device 14. This device is programmed in accordance with the present invention to digitize the scene images and then manipulate the digitized scene image data, image frame-by-image frame, under the control of edit controller 16, to converge the scene images acquired by cameras 1 and 3 of FIG. 1, i.e., to simulate an orientation of the cameras such that axes 7 and 8 converge (intersect) to a selected one of the objects 9–11 in the scene. Thus, in this convergence operation, if, for example, object 9 is selected as the subject of the scene to which optical axes 7 and 8 are converged, video effects device 14 manipulates the image data of object 9, such that the images of object 9 in each pair of corresponding scene image frames respectively acquired by cameras 1 and 3 are in relative superimposed positions in the corresponding scene image frames.

Also, since the image light path for camera 3 is reflected by beam splitter 5, the video effects device 14 must also rotate or flip the image frames of the scene images recorded by recorder 3a *180°* or otherwise cancel the mirror images created by beam splitter 5, so that they are of the same image orientation as the image frames recorded by recorder 1a.

A suitable video effects device 14 for purposes of the present invention is available from various sources, such as Ampex Systems Corp. of Redwood, Calif. The edit controller may be an Omni 1000E marketed by CMX Corp.

After processing by video effects device 14, the image frames acquired by cameras 1 and 3 are separately fed to a video switcher 15, such as a 200CV Component Analog Switcher available from Tektronix Corp. (Grass Valley Group) of Grass Valley, Calif. Video switcher 15 is programmed in accordance with the present invention to slice a different partial image from each image frame acquired by one of the cameras, e.g., camera 3, and then to splice each partial image into a different one of the image frames acquired by camera 1 in place of the corresponding partial image slice. The resulting effect is that a sequence of differing partial images obtained from the image frames acquired from camera 3 are repetitively scanned through the image frames acquired by camera 1 on a corresponding image frame-by-image frame basis to create a succession of composite image frames into which parallax information has been introduced. The succession of composite image frames is stored by a video recorder 17.

This scanning operation is illustrated in FIGS. 3(a)–3(h), wherein eight consecutive composite image frames are represented. In each of frames 1–8, letter A indicates the portion of an image frame acquired by camera 1, and letter B represents the partial image taken by video switcher 15 of FIG. 2 from a corresponding image frame acquired by camera 3. Partial image B, illustrated in the form of a diagonally elongated slice or slit of a selected width, is substituted for the corresponding image slice of image A on a synchronized image frame-by-image frame basis by video switcher 15. The position of the partial image B, taken from a different slice of the image frames acquired by camera 3, is shifted from frame to frame of the image acquired by camera 1, and thus the partial images B are, in effect, slit scanned through the image frames A acquired by camera 1. As illustrated in FIGS. 3(a)–3(h), the partial images B progress or scan through the images A diagonally from upper left to lower right and back to upper left of the composite image frames, completing a scan cycle at a cycling rate of at least 3 Hz and preferably in the range of 3–6 Hz.

As seen in FIG. 2, the composite image frames produced by video switcher 15 are recorded by recorder 17 under the synchronizing control of edit controller 16. When the composite image frames are subsequently displayed at a rate of, for example, 30 frames per second, the parallax information introduced into images A by the slit-scanned partial images B enables a viewer to perceive one or more of the objects 9–11, to which cameras 1 and 3 are focused, three-dimensional, i.e., autostereoscopically, without the use of special glasses.

Rather than scanning single image slits (slices) of the images acquired by camera 3 through the image frames acquired by camera 1, multiple image slits may be utilized, as illustrated at B1, B2, and B3 in the composite image frames 1–8 of FIGS. 4(a)–4(h). As also illustrated, the slit configuration may be herringbone rather than straight-sided as in FIGS. 3(a)–3(h). Partial image slits B1, B2 and B3 are illustrated in FIGS. 4(a)–4(h) as being diagonally scanned through frames of images A acquired by camera 1 from upper right to lower left at a cycling rate of 3.75 hertz.

Figure 5A:
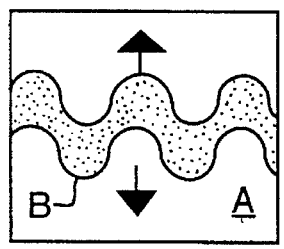
FIGS. 5(a)–5(g) illustrate further alternative composite image frames that might be generated by the apparatus of FIG. 2.
Figure 5B:
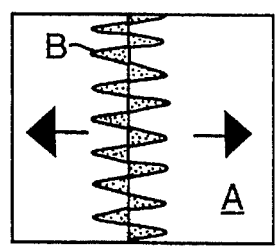
Figure 5C:
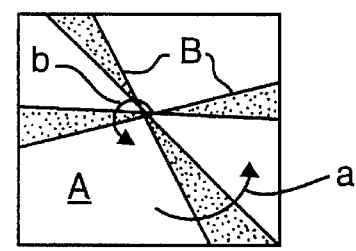
Figure 5D:
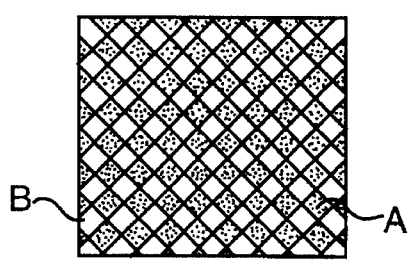
Figure 5E:
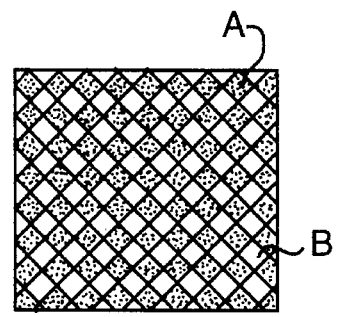
Figure 5F:
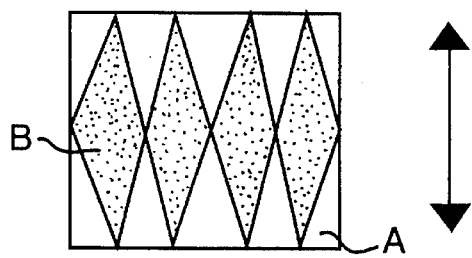
Figure 5G:
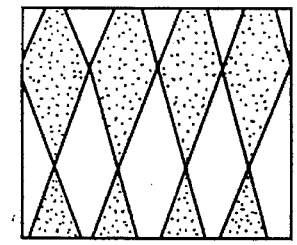

Numerous other partial image (slit) configurations are applicable to the present invention, of which several are illustrated in the composite image frames of FIGS. 5(a)–5(f). In FIG. 5(a), partial image slits B are in the form of a wave sweeping vertically through images A. Sawtooth partial image slits B may be swept horizontally through images A, as illustrated in FIG. 5(b). FIG. 5(c) illustrates a rotary fan pattern of partial image slices B sweeping counterclockwise (arrow a) through images A; the center of the pattern also revolving about the center of the composite frames, as indicated by arrow b. FIGS. 5(d) and 5(e) illustrate partial images B in the form of alternating mosaic patterns, which create the effect of the partial images being scanned or stepped through images A. Then in FIGS. 5(f) and 5(g), backgammon board-shaped partial images B are swept vertically through images A. The edges of the partial images B may be hard or soft.

If the video switcher 15 is equipped with a so-called luminance key function, a scanning partial image pattern can be prerecorded as a repeating succession of frames, with each frame having the desired partial image pattern superimposed on a plain blackground. The recorded partial image pattern is then fed to the video switcher in frame coordination with the image frames from the two cameras. Based on the partial image pattern input, the video switcher assigns the images acquired by, for example, camera 1 to the background and the images acquired by camera 3 to the partial image pattern, thereby producing the composite image frames. It will be appreciated that a variety of partial image patterns can be prerecorded and used experimentally in post production facilities to determine which pattern provides composite frames affording optimum stereoscopic effect for a particular scene.

Figure 6:
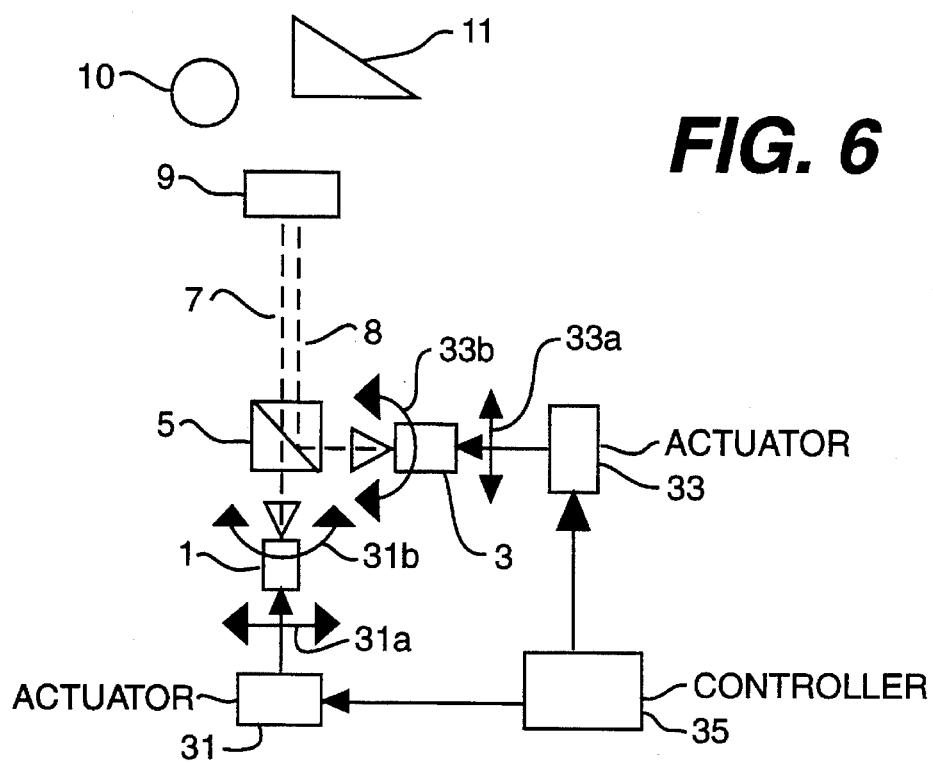
FIG. 6 is a plan view, similar to FIG. 1, of an alternative embodiment of the invention.

FIG. 6 illustrates that cameras 1 and 3 may be separately mounted for movement relative to each other and to beam splitter 5 by actuators 31 and 33, respectively, under the control of a controller 35. It is seen that, by virtue of beam splitter 5, controlled movement by actuator 31 of camera 1 in the X direction (arrow 31a), either alone or in combination with controlled movement of camera 3 in the Y direction (arrow 33a), varies the separation at beam splitter 5 of axes 7 and 8 of the scene image light paths leading to cameras 1 and 3, respectively. Axis separation at the beam splitter determines the disparity (separation) of the effective points of view of cameras 1 and 3 and thus the degree of parallax of the scene images acquired by the two cameras. Again, by virtue of beam splitter 5, controlled rotations, indicated by arrows 31b and 33b, of cameras 1 and 3 by actuators 31 and 33 about their respective image planes (not shown) can angularly orient axes 7 and 8 to produce a convergence the axes to a selected one of the objects 9–11 in the scene. The capability of mechanically setting the point of convergence of axes 7 and 8 in a scene relieves the digital effects device 14 in FIG. 2 of having to perform this function electronically.

Figure 7:
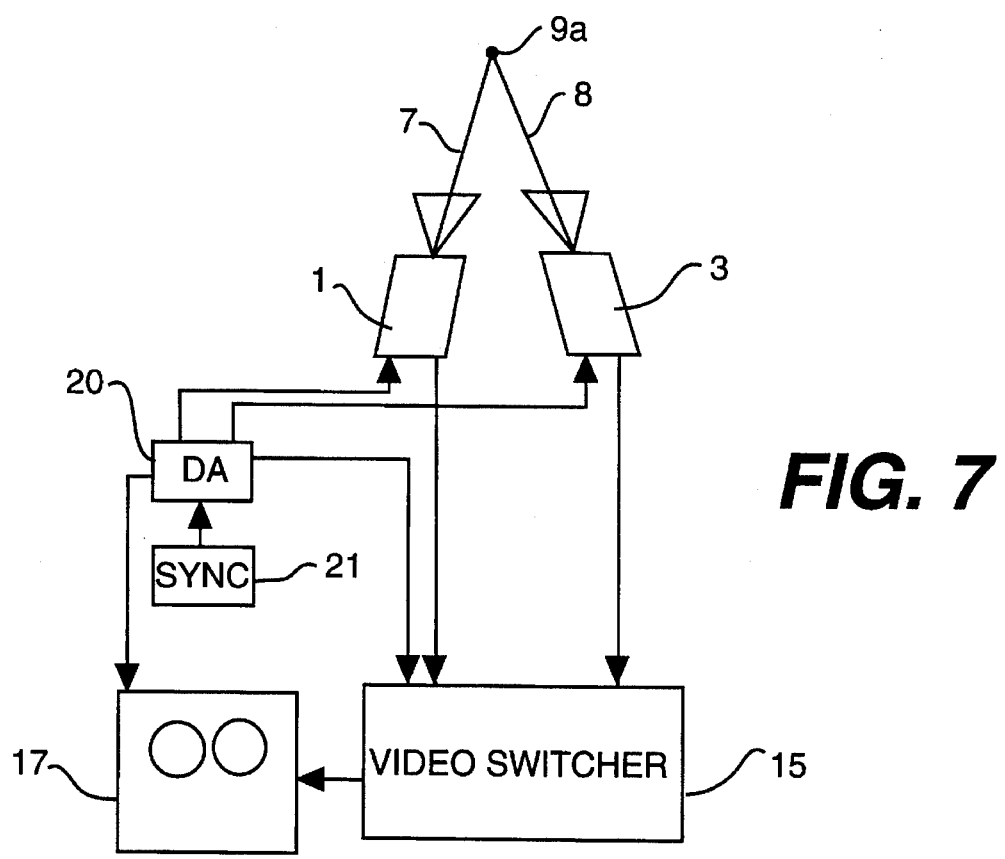
FIG. 7 is a block diagram of another embodiment of the invention.

The embodiment of the invention illustrated in FIG. 7 has particular application to essentially real time or field production of composite image frames suitable for autostereoscopic display. Video taps of cameras 1 and 3, which may be a pair of identical Arriflex 535 or 16SR-3 motion pictures cameras or Sony BVP-T70 video cameras, are connected to separately feed the images acquired by the cameras in parallel to video switcher 15. Such cameras are sufficiently miniaturized, such that they can be arranged in desired relative parallax positions with their respective optical axes 7 and 8 converged on a selected object (point 9a) in a scene without resort to beam splitter 5. Thus, the embodiment of FIG. 7 can dispense with the video effects device 15 of FIG. 2. Moreover, if video switcher 15 is programmed in accordance with the present invention for standalone operation, edit controller 16 may also be omitted in the embodiment of FIG. 7. The requisite synchronization of cameras 1 and 3, video switcher 15 and video recorder 17 may be provided by sync pulses produced by a generator 21, which are routed to these components by video distribution amplifier 20. As in the embodiment of FIG. 2, the video switcher takes partial images from the images acquired by camera 3 and scans the partial images through the images acquired by camera 1 on a corresponding image frame-by-image frame basis. The resulting composite image frames are recorded in succession by video recorder 17.

Figure 8:
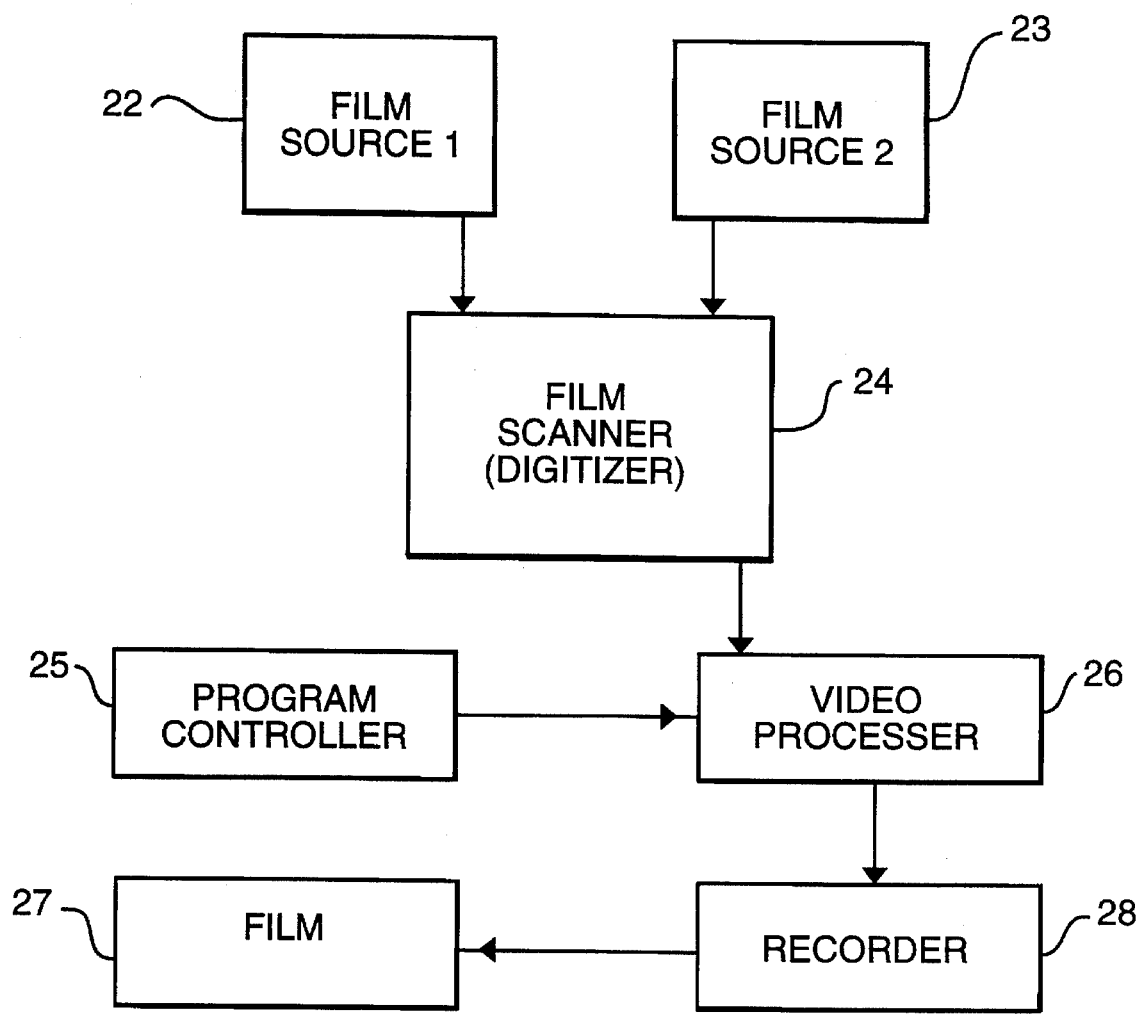
FIG. 8 is a block diagram of still another embodiment of the invention.

FIG. 8 illustrates an embodiment of the invention for creating autostereoscopic composite image frames from two motion picture cameras positioned at different points of view. Developed film 22 from camera 1 and developed film 23 from camera 3 are scanned by film scanner 24 to digitize the respective recorded images, frame-by-frame, and the digitized images are fed to a video processor 26. In accordance with the present invention, the video processor is programmed or externally controlled, as represented by program controller 25, to perform the functions of video effects device 14 (convergence and image reversal, if necessary) and video switcher 15 (slit scanning of digitized partial images obtained from film source 23 through the digitized image frames obtained from film source 22). The resulting composite image frames are then recorded on movie film 27 by, for example, a film recorder 28. Subsequent projection of film 27 provides a display of the composite image frames in perceived three-dimension.

In the embodiment of the invention seen in FIG. 9, cameras 41, 42, 43 and 44 are arranged along an arc 40 about an object 39 in their fields of view. The cameras are pointed such that their optical axes converge on object 39. Taking the image frames acquired by camera 34 as base images, the image frames acquired by cameras 31, 32 and 33 are processed by a video switcher (not shown) to produce composite image frames, such as illustrated in FIGS. 10(a)–10(e). As seen in frame 1 of FIG. 10(a), a partial image taken by the video switcher from an image frame acquired by camera 31 of FIG. 9 is inserted in an image frame 34a acquired by camera 34 as a slice 31a extending diagonally across the upper left corner of the frame. In frame 2 (FIG. 10(b), a partial image from an image frame acquired by camera 32 is inserted into the next image frame 34a acquired by camera 34 as a diagonal slice 32a in a position displaced toward the lower right corner of the frame from the position of diagonal slice 31a in frame 1 (FIG. 10(a). Then in frame 3 (FIG. 10(c), a diagonal image slice 33a taken from an image frame acquired by camera 33 is inserted in the next image frame 34a, acquired by camera 34 at a position displaced toward the lower right corner of the frame from the position of partial image slice 32a in frame 2. Composite frames 4 and 5 in FIGS. 10(b) and 10(e), respectively illustrate that the sequence of partial images 31a, 32a, 33a from cameras 31, 32, 33, respectively, inserted into additional successive image frames 34a, repeats to effectively produce diagonal slit scanning of alternating parallax partial images from cameras 31, 32, 33 through image frames 34a acquired by camera 34. Subsequent display of the composite image frames may be perceived stereoscopically.

Rather than provide three cameras 31, 32 and 33, requisite composite image frames may be produced using a single camera mounted for reciprocating movement along arc 40 through the illustrated positions of the three cameras as parallax images are acquired for partial image compositing with image frames acquired by camera 34.

Figure 11:
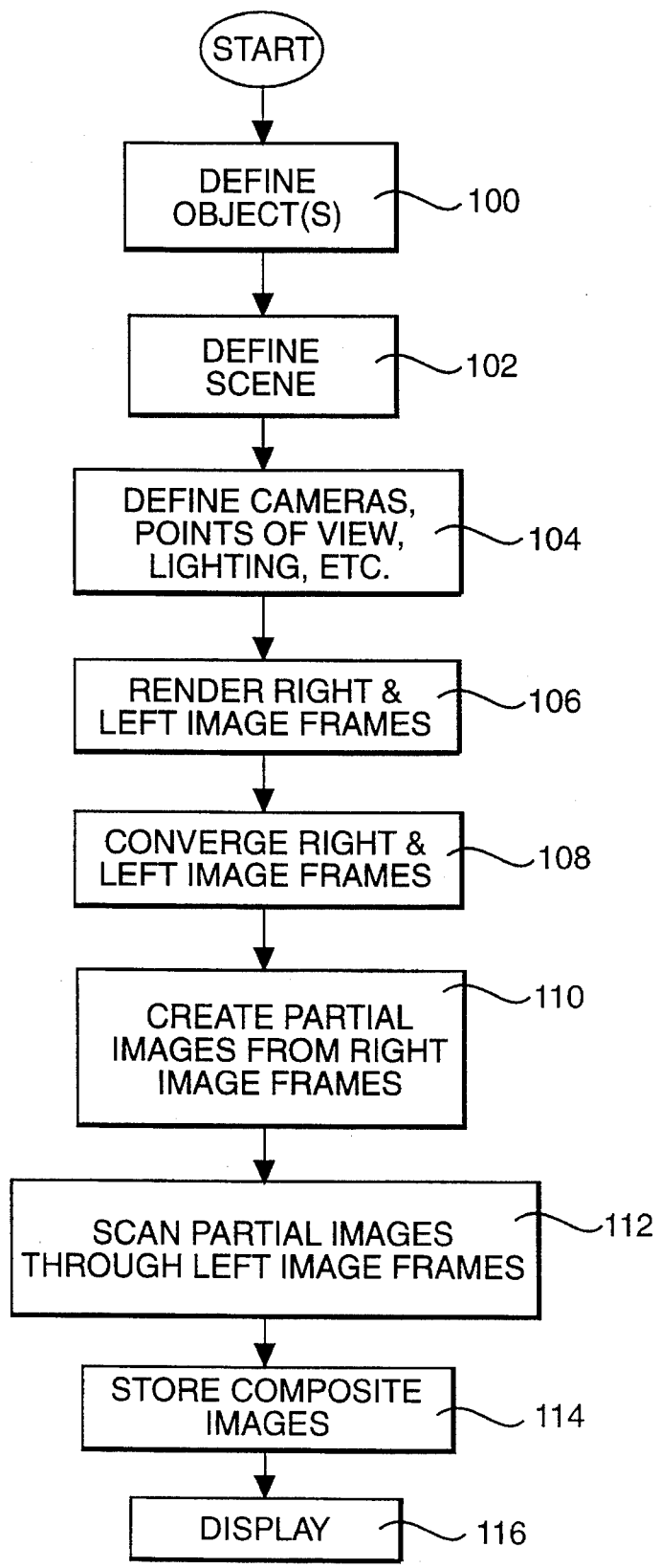
FIG. 11 is a flowchart illustrating a method of the present invention performed as a series of computer-implemented steps.

The principles of the invention embodiments described thus far may also be applied to computer generation of composite image frames which then can be displayed in three-dimensional illusion. FIG. 11 illustrates the basic computer-implemented steps involved. In step 100, objects and object motions are defined in three-dimensional space, and a scene to include the objects is also defined in three-dimensional space in step 102. The imaging device or devices (cameras), camera positions (points of view), lighting, range, etc., are defined in step 104. Camera definitions also include simulations of imaging planes and characteristics of the camera optics. In step 106, image frames of the scene from at least two points of view are rendered, e.g., right and left points of view acquired by the cameras defined in step 104. The rendered left and right image frames of the scene are converged on a selected subject (object) in the scene in step 108. Partial images are taken from, for example, each of the right image frames in step 110, and these partial images are scanned through the left image frames on a corresponding image frame-by-image frame basis in step 112. Alternatively, to expedite computer processing and save memory space, only the partial images acquired from the right point of view need be rendered and scanned through the left image frames. In step 114, the resulting composite image frames are stored in computer memory. The stored composite frames are then retrieved from memory for display on a computer monitor, recorded on video tape or disk for subsequent display on a TV screen, and/or recorded on film for projection onto a movie screen (step 116).

In the embodiments of the invention described thus far, composite image frames containing parallax information are created by scanning partial images taken from full frame images acquired by one or more second cameras through full frame images acquired by a first camera having a point of view different from the point of view of the second camera. Enhanced stereoscopic perception of displayed composite images can be achieved when the slit scanning of partial images derived from one camera through images derived from another camera is limited to the images of those objects in the scene to which the optics of the cameras are converged and focused. This approach simulates the human visual system, wherein only objects in a scene that fall within a limited depth of field, known as Panum's Fusion Area, of the converged left and right eyes are perceived as three-dimensional in that they appear to be solid, possess a sense of volume and have surface texture. Objects in front of and behind Panum's Fusion Area appear as double images and are generally out of focus. Within Panum's Fusion Area is the visual horopter which is defined as a curved surface in a visual field that establishes a set of points from which light falls on the same relative retinal locations of the two eyes. Objects outside of the horopter area appear two-dimensional. Only by continuously shifting focus and convergence of the right and left eyes can the human brain perceive the entire scene as three-dimensional.

Figure 12:
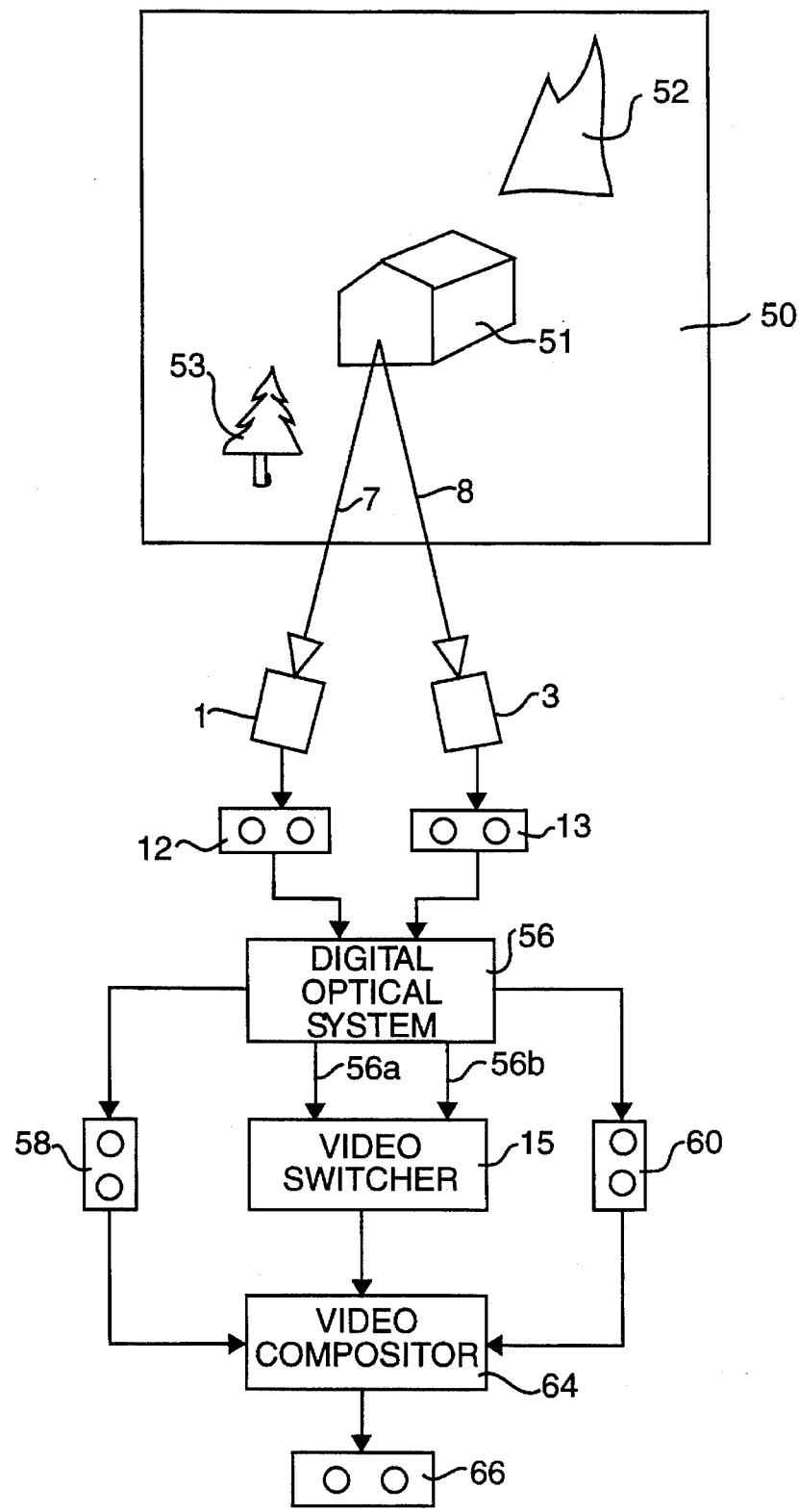
FIG. 12 is a schematic diagram of yet another embodiment of the invention.

The embodiment of the invention illustrated in FIG. 12 is constructed to simulate this horopter phenomena of the human visual system. Reference 50 indicates a scene in the fields of view of cameras 1 and 3. As illustrated, the camera optical axes 7 and 8 are converged on house 51, to which the camera optics are also focused. Mountain 52 represents a distant or background object in the scene, and tree 53 represents a near or foreground object. Successive frames of the images acquired by cameras 1 and 3 are separately recorded by video recorders 12 and 13, respectively, as in the embodiment of FIG. 2. The recorded images are played back as separate inputs to a digital optical system 56, such as a Domino System available from Quantel Inc. of Darien, Conn. If the optical axes of the cameras are not converged on object 51, the recorded left source (camera 1) and right source (camera 3) images are played back to digital optical system 56 through a video effects device 14, as in FIG. 2, which functions to converge the left and right images to a selected subject in the scene and to mirror-image the appropriate one of the succession of image frames if a beam splitter 5 (FIG. 1) is employed.

Figure 13A:
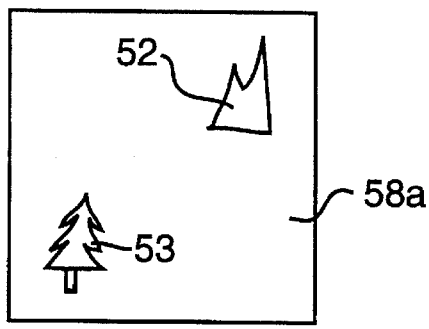
FIGS. 13(a)–13(e) are illustrations of image frames that might be generated by the embodiment of FIG. 12.
Figure 13B:
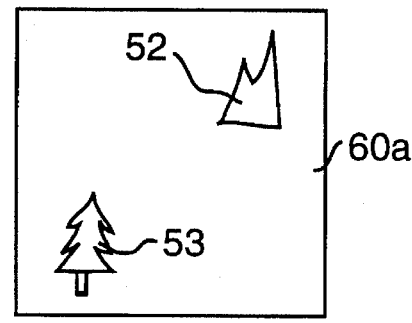
Figure 13C:
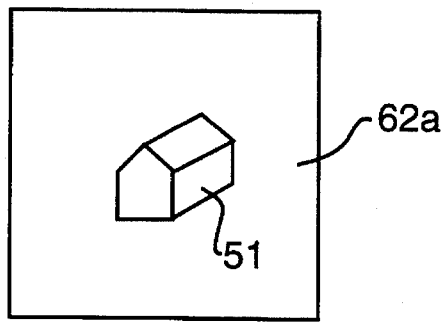
Figure 13D:
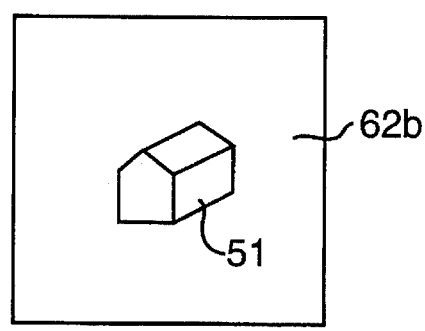

Using digital optical system 56 in accordance with the invention, the subject in the scene (house 51), and any adjacent objects included with the subject in the natural horopter, are matted by image mats from each frame of each of the left and right source images. This horopter matting operation produces corresponding (in time) left source image frames 58a and right source frames 60a of scene 50, as illustrated in FIGS. 13(a) and 13(b). Note that house 51 is matted out of image frames 58a and 60a. The left source image frames 58a, created by digital optical system 56 of FIG. 11, are stored in a recorder 58, as the right source image frames 60a are stored in a recorder 60. Reverse mats obtained from the horopter mats used in creating image frames 58a and 60a are employed by digital optical system 56 to create left and right source image frames of the scene, which are illustrated in FIGS. 13(c) and 13(d), respectively. Note that foreground object 53 and background object 52 are matted out, leaving only the image of house 51. Image frames 62a and 62b, which may be considered as left and right horopter image frames, respectively, are fed by digital optical system 56 over separate connections 56a, 56b to video switcher 15. As in the embodiments described above, the video switcher takes partial images of house 51 from each of the horopter image frames from one source, e.g., frames 62b (FIG. 13c), and slit scans these partial images through the full house images of horopter frames 62a (FIG. 13d) on a corresponding frame-by-frame basis.

The image frames 58a stored in recorder 58 and image frames 60a stored in recorder 60 are read out in frame-synchronized, parallel relation to a video compositor 64, where they are recorded frame-by-frame, one over the other, as 50/50 or double image composite frames. The composite horopter image frames created by video switcher 15 are also fed to video compositor 64, where they are composited in the proper locations (horopter mat area created by digital optical system 56) in the composited double image frames 58a, 60a on a synchronized frame-by-frame basis. A suitable video compositor for this purpose may be a Quantel Harry marketed by Quantel Inc. of Darien, Conn.

Figure 13E:
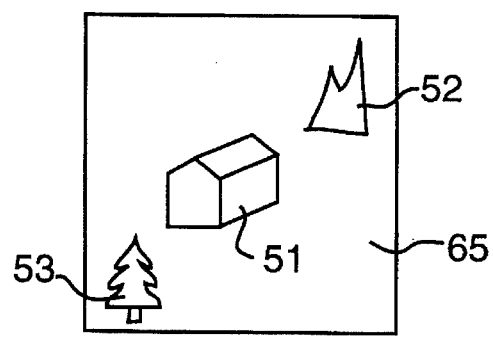

The final composited image frames 65, illustrated in FIG. 13(e), are fed by the digital video compositor 64 to a video recorder 66. Upon subsequent display of these composited image frames, house 51 can be perceived as having enhanced stereoscopic qualities. The foreground 53 and background 52 objects will appear two-dimension and free of jitter. However, since the camera axes 7, 8 were not converged on these objects, their images are not precisely aligned when non-horopter or remainder image frames 58a and 60a are composited by video compositor 64. Thus, when displayed, the features of tree 53 and mountain 51 appear as slightly displaced, double images. If this is objectionable, a video effects device 14 (FIG. 2) may be used to precisely align the images of the foreground objects on image frames 58a and 60a, as well as the background images, prior to being composited with the composite horopter image frames produced by video switcher 15.

Rather than creating composite image frames in post-production facilities, the composite image frames 65 may be created on an essentially real-time basis. In such case, live video images acquired from the two points of view are digitized and processed in a computer using image processing software suitable for purposes of the present invention. By alternately comparing corresponding left and right image frames, the magnitudes of relative displacements of images of the same objects appearing in the two frames can be used as indicators of foreground, background and horopter objects in the scene. As described in the copending Bacs, Jr. application Ser. No. 08/148,916, cited above, images of in-focus objects located at the convergence of the optical axes associated with two points of view, i.e., horopter objects, appear stationary, while images of objects outside of the horopter area appear to move or jitter. Thus, by computer processing the left and right source images, horopter objects can be identified as those objects having zero or minimal apparent motion. The horopter images and non-horopter images can then be automatically matted and separately processed by a computer in the manner described above in conjunction with FIGS. 12 and 13(a)–13(d) to produce composite image frames 65 such as illustrated in FIG. 13(e).

Figure 14:
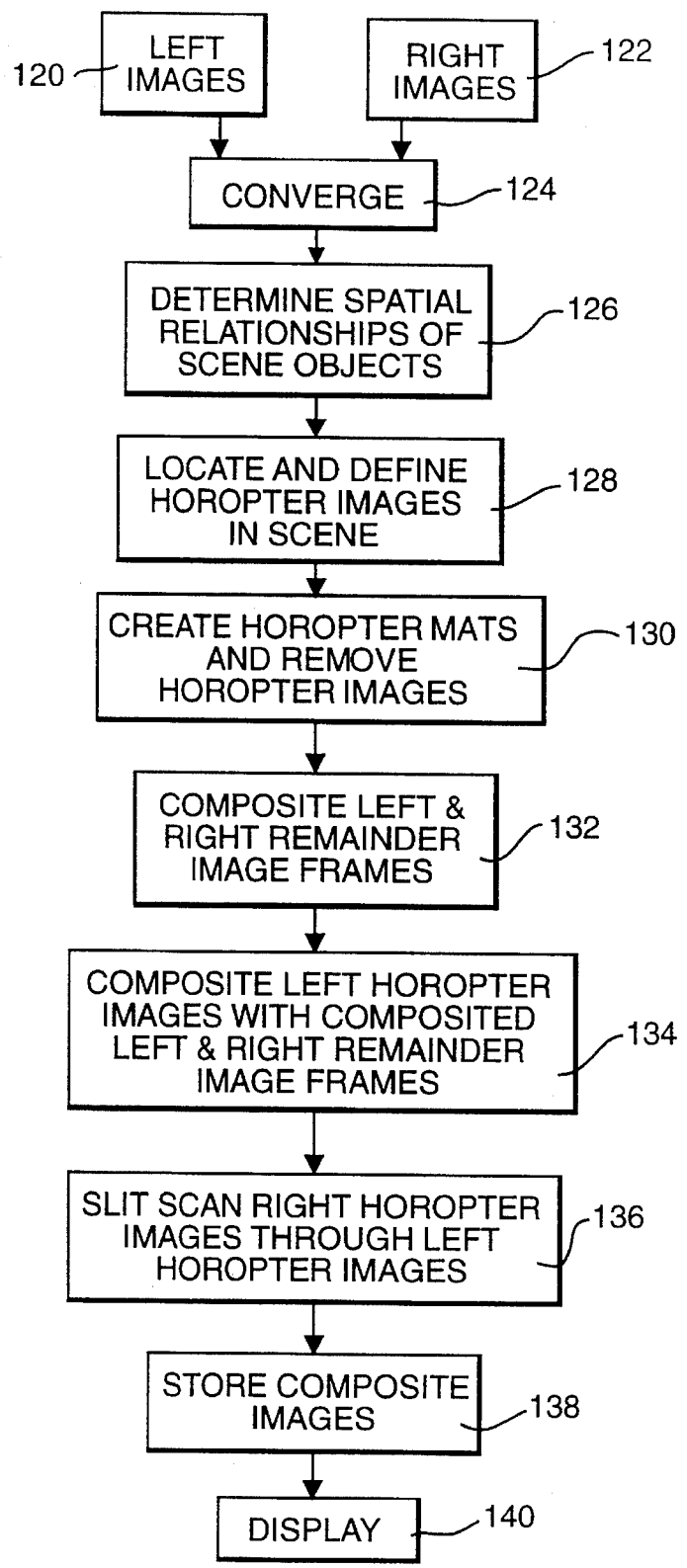
FIG. 14 is a flowchart illustrating the operation of the embodiment of the invention in FIG. 12.

A flowchart graphically illustrating the operation of this embodiment of the invention is seen in FIG. 14. Image frames 120 acquired from a left point view (camera 1) and image frames 122 acquired from a right point of view (camera 3) are image processed in step 124 to converge the right and left image frames on a selected object, e.g., house 41 in FIG. 12, if the camera optical axes are not converged when the image frames were acquired. If they were, step 124 is bypassed. In step 126, spatial relationships of the objects in the scene are determined by comparing corresponding left and right image frames to determine object motions. As described above, image positions of objects in the horopter's area of the scene are essentially aligned in corresponding (in time) left and right image frames. The image positions of other objects are displaced in corresponding left and right image frames; the magnitudes of the displacements being directly related to the object distances from the horopter area. On the basis of the spatial determination of the objects in the scene, the horopter area of the scene is located and defined in step 128. In step 130, mats are created for the images of the objects in the horopter area, and the horopter area object images are removed from the left 120 and right 122 image frames. The left and right remainder image frames, i.e., sans the horopter images, are then composited one over the other in a double image manner (step 132). As an alternative to the operation described in conjunction with FIGS. 12 and 13(a)–13(e), the removed left horopter images (step 130) are composited with the composited left and right remainder image frames (step 132) in step 134. Then, partial images of the right horopter images are slit scanned through the left horopter images in step 136. The resulting composite image frames are stored (step 138) for subsequent retrieval and display in three-dimensional illusion (step 140).

Figure 15:
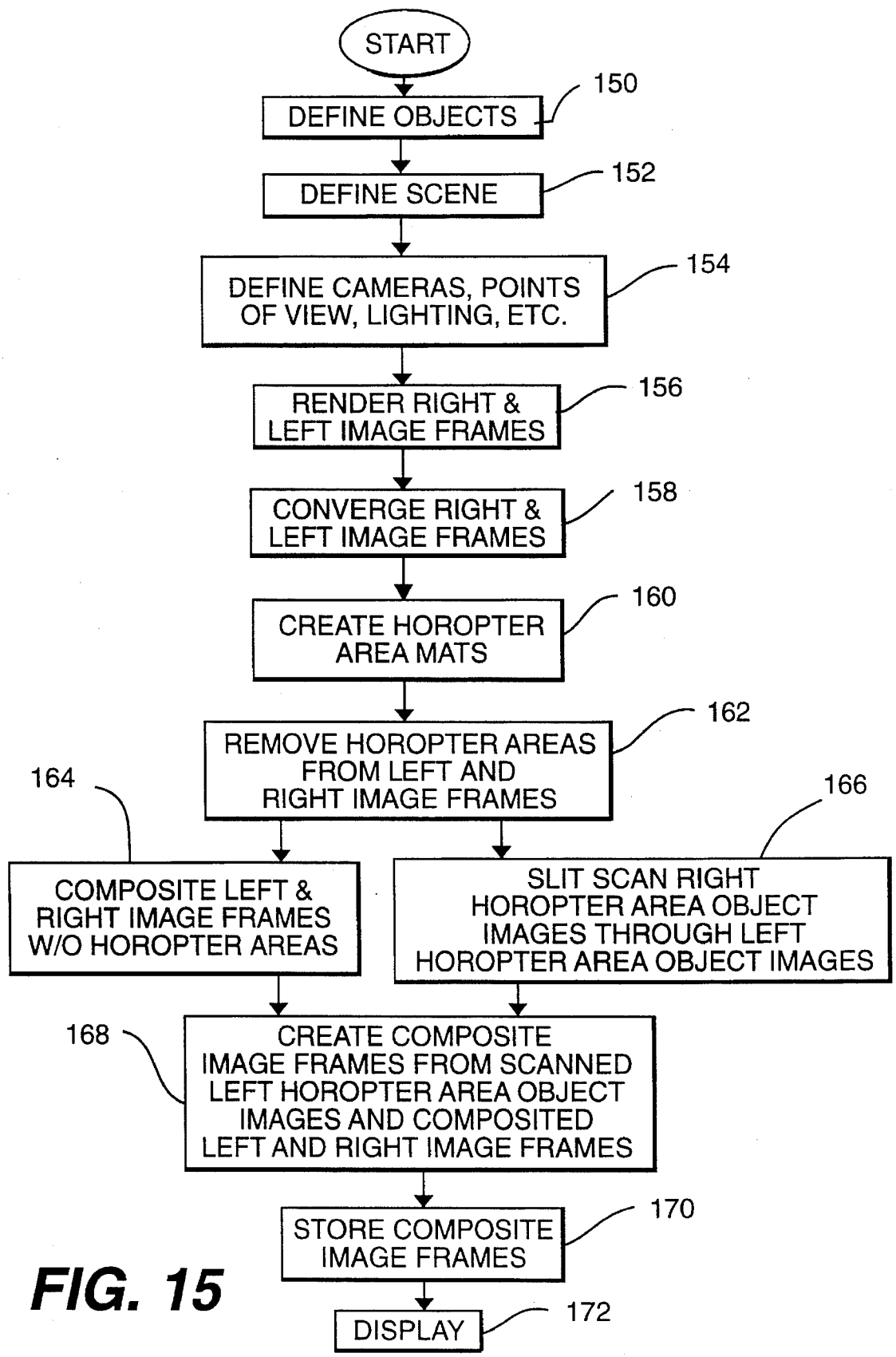
FIG. 15 is a flowchart depicting a succession of computer-implemented steps for performing a method according to an alternative embodiment of the invention.

The flowchart of FIG. 15, which is similar to the flowchart of FIG. 11 illustrates application of the principles of the embodiment according to FIGS. 12–14 to computer generation of composite frames that can be displayed in three-dimensional illusion. Thus, in step 150, objects and object motions are defined in three-dimensional space, and a scene to include the objects is defined in three-dimensional space in step 152. The cameras, camera image planes, optics, points of view, lighting, etc., are defined in step 154. In step 156, right and left image frames originating from the defined camera points of view are rendered and then converged to a selected horopter area in the defined scene in step 158. Horopter area mats are then created for the rendered right and left image frames in step 160. Using the horopter mats, the left and right horopter areas are removed from the left and right image frames in step 162. The left and right image frames without the horopter areas (remainder image frames) are composited in step 164, while the right horopter area object images are slit scanned through the left horopter area images in step 166. In step 168, composite image frames are created from the composited remainder image frames and the composited slit scanned horopter images. The composite image frames are stored in computer memory (step 170) for subsequent display in three-dimensional illusion (step 172).

While the hardware embodiments of the present invention have been described as using at least two imaging devices or cameras to acquire multiple image frames from different points of view for slit-scanned image processing, a single camera, such as an Ikegami LK-33 stereo video camera may be utilized. Stereo video cameras of this type are equipped with a pair of lens systems for focussing parallax views of a scene on separate imaging planes and separate video taps at which the parallax image frames are concurrently available for image processing in parallel by the apparatus and method of the present invention. It will also be appreciated that, rather than acquiring parallax images from points of view in positions of horizontal disparity (left and right points of view as described above), requisite parallax information can be introduced into the composite image frames from parallax images acquired from points of view in positions of vertical disparity or in positions having components of both horizontal land vertical disparity, i.e., diagonally related positions.

While it is preferred that corresponding image frames from the different points of view be acquired concurrently in time, it will be appreciated that the image frames may be acquired alternatingly. In this case, the successively acquired image frames of each consecutive pair of image frames would be processed by the video switches as corresponding image frames to produce a succession of composite image frames. However, the image acquisition rate would have to be significantly accelerated to minimize undesirable affects object motion in the scene being imaged. In this regard, the moving lens aperture approach disclosed in the cited Bacs, Jr. application Ser. No. 08/148,916 might be used to acquire alternating parallax image frames in sufficiently rapid succession.

Also, in the case of video cameras wherein each frame is imaged as a pair of scan interlaced image fields, it will be appreciated that the parallax scanning principles of the present invention may be performed on corresponding image fields generated by a pair of video cameras. Thus, it is intended that the terms "image frames", as used herein, be construed to encompass video camera image fields.

In addition, the principles of the present invention are also applicable to still photography. In this application, a single pair of image frames acquired from different points of view, such that different partial images taken from one image frame are slit-scanned through the other image frame to create a succession of composite image frames. Display of the succession of composite image frames may then be perceived stereoscopically.

It will be apparent to one skilled in the visual arts field that, in view of the foregoing specification and accompanying drawings, various modifications and variations can be made in the autostereoscopic imaging apparatus and method of the present invention without departing from the scope or spirit of the invention. Thus, it is intended that the present invention cover modifications and variations provided they come within the scope of the appended claims and their equivalents.

I claim:

1. Autostereoscopic imaging apparatus comprising in combination:

imaging means for acquiring first and second images of the same scene from respectively different points of view; and an image processor coupled to receive the first and second images and adapted to extract a succession of different partial images from the second image and to sequentially substitute the extracted partial images in place of corresponding partial images in a repetitive scanning manner in the first image to create a succession of composite images viewable in perceived three-dimensional illusion without special viewing aids.

2. The autostereoscopic imaging apparatus defined in claim 1, which further includes means for storing the succession of composite images.

3. The autostereoscopic imaging apparatus defined in claim 1, which further includes means for two-dimensionally displaying the succession of composite images in perceived three-dimensional illusion.

4. The autostereoscopic imaging apparatus defined in claim 1, which further includes means for creating corresponding first and second subject image portions and corresponding first and second remainder image portions from each of the first and second images, respectively;

said image processor separately processing the corresponding first and second subject image portions to extract progressively different partial images from the second subject image portion and to substitute the extracted partial images in place of corresponding partial images in the first subject image portion on a repetitious basis to create a succession of composited subject images; and a compositor for compositing the succession of composited subject images with a double image composition of the first and second remainder image portions to create the succession of composite images.

5. The autostereoscopic imaging apparatus defined in claim 1, which further includes means for converging the first and second images to a selected subject in the scene.

6. The autostereoscopic imaging apparatus defined in claim 1, wherein the first image is a first succession of image frames, and the second image is a second succession of image frames, and the succession of composite images is a third succession of image frames, the apparatus further including means for synchronizing the first, second and third successions of image frames in time.

7. The autostereoscopic imaging apparatus defined in claim 6, which further includes means for converting the first and second images into digital video signals.

8. The autostereoscopic imaging apparatus defined in claim 6, wherein the imaging means includes a first camera for acquiring the first image and a second camera for acquiring the second image.

9. The autostereoscopic imaging apparatus defined in claim 6, wherein the image processor has a cycle rate of 3–6 Hz.

10. The autostereoscopic imaging apparatus defined in claim 6, wherein each partial image of the second image and each corresponding partial image of the first image include plural image slices of the first and second images.

11. An autostereoscopic imaging method comprising the steps of:

acquiring a first image of a scene from a first point of view;

acquiring a second image of the scene from a second point of view different from the first point of view;

extracting a succession of different partial images from the second image; and sequentially substituting the succession of extracted partial images in a repetitive scanning manner in place of like partial images in the first image to create a corresponding succession of composite images viewable in perceived three-dimensional illusion without special viewing aids.

12. The autostereoscopic imaging method defined in claim 11, which further includes the step of storing the succession of composite images.

13. The autostereoscopic imaging method defined in claim 11, which further includes the step of displaying the succession of composite images in perceived three-dimensional illusion.

14. The autostereoscopic imaging method defined in claim 11, wherein the substituting step is performed at a cycle rate of at least 3 Hz.

15. The autostereoscopic imaging method defined in claim 11, which further includes the steps of:

separating the first image into subject and remainder image portions;

separating the second image into subject and remainder image portions;

performing the partial image extracting and substituting steps only for the subject image portions of the first and second images to create a succession of composited subject image portions; and compositing the composited subject image portions with a double image composition of the remainder image portions of the first and second images to create the succession of composite images.

16. The autostereoscopic imaging method defined in claim 15, which further includes the step of alternately comparing the first and second images to identify the subject and remainder image portions of the first and second images for separation by the separating steps.

17. The autostereoscopic imaging method defined in claim 11, which further includes the step of converging the first and second images to a selected subject in the scene.

18. The autostereoscopic imaging method defined in claim 11, wherein the first image is acquired as a first succession of image frames, and the second image is acquired as a second succession of image frames, the method further including the step of synchronizing the first and second successions of image frames and the succession of composite images in time.

19. The autostereoscopic imaging method defined in claim 11, wherein the first and second images are acquired by first and second cameras, respectively, the method further comprising the step of changing the relative positions of the first and second cameras.

20. Autostereoscopic imaging apparatus comprising, in combination:

a first imaging device for recording first images of a scene as a succession of first image frames;

a second imaging device for recording second images of the scene in synchronism with the first images, the second images being a succession of second image frames of differing parallax from the first image frames;

a video switcher for processing the first and second recorded images, such as to provide partial images of the second images and to effectively scan the partial images through the first images on a corresponding image frame-by-image frame basis to produce a succession of composite image frames comprising the first image frames and the partial images from the second image frames; and means for recording the composite image frames for subsequent autostereoscopic display in perceived three-dimensional illusion without special viewing aids.

21. The autostereoscopic imaging apparatus of claim 20, which further includes a video effects device for processing the first and second images to produce a simulated optical axes convergence of the first and second imaging devices to a desired point in the scene, the processed first and second recorded images being fed to the video switcher.

22. The autostereoscopic imaging apparatus of claim 20, wherein a first optical axis of the first imaging device and a second optical axis of the second imaging device are oriented in relative angular relation, the apparatus further including an optical element for directing the first and second optical axes toward the scene.

23. The autostereoscopic imaging apparatus of claim 22, wherein the optical element is a beam splitter, the apparatus further including a video effects device for processing the first and second images to produce mirror images of one of said first and second images and to produce a simulated convergence of the first and second optical axes to a desired point in the scene, the processed first and second images being fed to the video switcher.

24. The autostereoscopic imaging apparatus of claim 22, which further includes means mounting at least one of the first and second imaging devices for linear and pivotal motion relative to the optical element and a controller for controlling the mounting means to linearly and pivotally position the one of the first and second imaging devices, such as to create a selected parallax relation of the first and second optical axes directed toward the scene and a convergence of the first and second optical axes at a selected point in the scene.

25. The autostereoscopic imaging apparatus of claim 22, which further includes:

first means mounting the first imaging device for linear and pivotal motion relative to the optical element;

second means mounting the second imaging device for linear and pivotal motion relative to the optical element; and a controller controlling the first and second mounting means to linearly and pivotally position the first and second imaging devices, such as to create a selected parallax relation of the first and second optical axes and a convergence of the first and second optical axes at a selected point in the scene.

26. The autostereoscopic imaging apparatus of claim 20, wherein the partial images of the second images are scanned through the first images at a cycle rate of 3–6 Hz.

27. The autostereoscopic imaging apparatus of claim 20, wherein the partial images of the second images are in the form of slit images.

28. The autostereoscopic imaging apparatus of claim 20, wherein the partial images of the second images are in the form of a herringbone pattern.

29. The autostereoscopic imaging apparatus of claim 20, wherein the partial images of the second images are in the form of a wave pattern.

30. The autostereoscopic imaging apparatus of claim 20, wherein the partial images of the second images are in the form of a sawtooth pattern.

31. The autostereoscopic imaging apparatus of claim 20, wherein the partial images of the second images are in the form of a mosaic pattern.

32. The autostereoscopic imaging apparatus of claim 20, wherein the partial images of the second images are in the form of fan pattern rotating about a center moving in a circular path about a center point of the first image frames.

33. The autostereoscopic imaging apparatus of claim 20, wherein the partial images of the second images are in the form of a Backgammon board pattern.

34. A method of autostereoscopic imaging comprising the computer-implemented steps of:

defining a scene in three-dimensional space including a plurality of objects;

defining first and second cameras for imaging the scene from different points of view;

rendering successions of first and second image frames of the scene as acquired by the first and second cameras, respectively;

taking different partial images from the second image frames;

repeatedly scanning the partial images through the first image frames on a corresponding frame-by-frame basis to create a succession of composite image frames viewable in perceived three-dimensional illusion without special viewing aids; and storing the composite image frames.

35. The method defined in claim 34, which further includes the steps of:

separating each of the first image frames into first horopter image portions and first remainder image portions;

separating each of the second image frames into second horopter image portions and second remainder image portions;

performing the partial image taking and scanning steps only on images of a selected subject in the first and second horopter image portions to create a succession of composited subject image portions; and compositing the first and second remainder image portions in double image with the composited subject image portions on a corresponding frame-by-frame basis to create the succession of composite image frames.

36. The method defined in claim 34, further comprising the step of displaying the composite image frames in perceived three-dimensional illusion.

37. An autostereoscopic imaging method comprising the steps of acquiring a succession of corresponding first and second images of a scene from respectively different points of view;

cyclically modifying an image portion of each successive first image using a like image portion from each successive second image corresponding thereto, the modified image portions being in different image locations in the first images during each modifying cycle to effectively scan the modified image portions through the first images, such as to create a corresponding succession of composite images viewable in perceived three-dimensional illusion without special viewing aids.

38. A method of autostereoscopic imaging comprising the computer-implemented steps of:

defining a scene in three-dimensional space including a plurality of objects;

defining first and second cameras for imaging the scene from different points of view and a corresponding succession of partial images of the scene as acquired by the second camera;

rendering a succession of image frames of the scene as acquired by the first camera and a corresponding succession of partial images of the scene as acquired by the second camera;

repeatedly scanning the partial images through the image frames acquired by the first camera on a synchronized basis to create a succession of composite image frames; and storing the composite image frames for subsequent display in three-dimensional illusion without special viewing aids.

* * * * *

UNITED STATES PATENT AND TRADEMARK OFFICE
CERTIFICATE OF CORRECTION

PATENT NO. : 5,510,831
DATED : April 23, 1996
INVENTOR(S) : Christopher A. Mayhew It is certified that error appears in the above-identified patent and that said Letters Patent is hereby corrected as shown below:

Claim 1, column 11, line 47, after "partial images", insert --in the first image--;

Claim 1, column 11, line 48, delete "in the first image".

Claim 11, column 12, line 42, delete "in a repetitive scanning manner";

Claim 11, column 12, line 43, after "first image", insert --in a repetitive scanning manner--.

In the title, line 2, "SUIT" should read --SLIT--.

Signed and Sealed this

Sixteenth Day of July, 1996

Attest:

BRUCE LEHMAN

*Attesting Officer*  *Commissioner of Patents and Trademarks*